Figure 1:
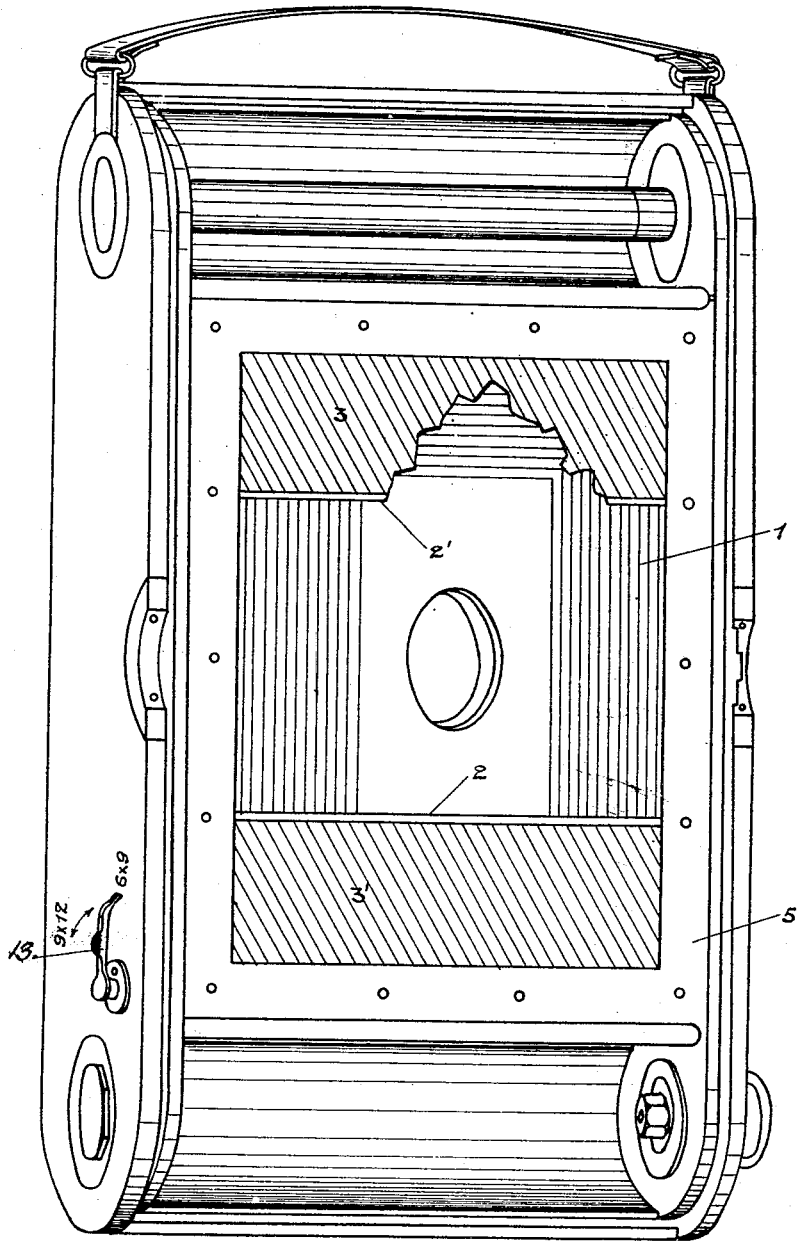

July 29, 1924.

S. COCANARI 1,503,302

PHOTOGRAPHIC APPARATUS

Filed Dec. 20, 1922    2 Sheets-Sheet 1

Inventor:
Silvio Cocanari
By [signature]
Attorney

July 29, 1924.  
S. COCANARI  
1,503,302  
PHOTOGRAPHIC APPARATUS  
Filed Dec. 20, 1922  
2 Sheets-Sheet 2

Inventor:  
Silvio Cocanari  
By Louis Pouivelzke  
Attorney

Patented July 29, 1924.

1,503,302

UNITED STATES PATENT OFFICE.

SILVIO COCANARI, OF ANTWERP, BELGIUM, ASSIGNOR TO GEVAERT PHOTO-PRODUC-TEN, N. V., OF OUDE-GOD, NEAR ANTWERP, BELGIUM.

PHOTOGRAPHIC APPARATUS.

Application filed December 20, 1922. Serial No. 608,025.

*To all whom it may concern:*

Be it known that I, SILVIO COCANARI, a subject of the King of Italy, residing at Antwerp, Belgium, have invented certain new and useful Improvements Relating to Photographic Apparatus, of which the following is a specification.

The present invention relates to improvements in photographic apparatus by means of which pictures of different sizes can at any time be taken with one and the same photographic camera and without any waste of the sensitized surfaces.

With ordinary photographic apparatus, pictures can be taken in such a way that they only cover part of the size of the negative of which the apparatus has been constructed, but a large part of the sensitized film is then uselessly exposed and therefore wasted.

In order to avoid such loss, one can make use of an apparatus for smaller sized negatives; but then a second apparatus is needed and the operator has to provide himself with films of corresponding size, which latter may not always be obtainable.

On the other hand, if the reverse is desired, that is to say, with an apparatus of a certain size, to take larger negatives, in that case also, another apparatus and films of a corresponding size are needed.

The apparatus to which has been applied the object of the present invention, does away with these difficulties.

According to the invention the exposure frame against which the sensitized film in the camera is placed, may at will be altered by means of a mechanism which varies the focal area of the camera and is itself controlled at the outside of the camera.

The details of the invention will be shown in the following description of two embodiments of the invention and in the drawings appended.

In these drawings, Fig. 1, is a perspective view of a photographic apparatus in which the reduction of the aperture of the exposure frame is obtained by screening or masking means in the form of curtains.

Figure 2:
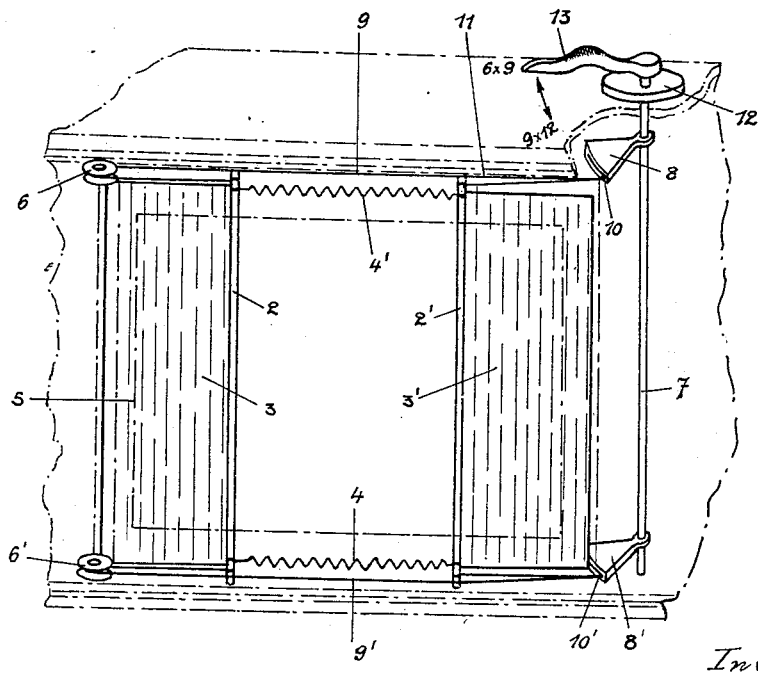

Figure 2 is a perspective view of the details of the mechanism used in the embodiment shown in Figure 1.

Figure 3:
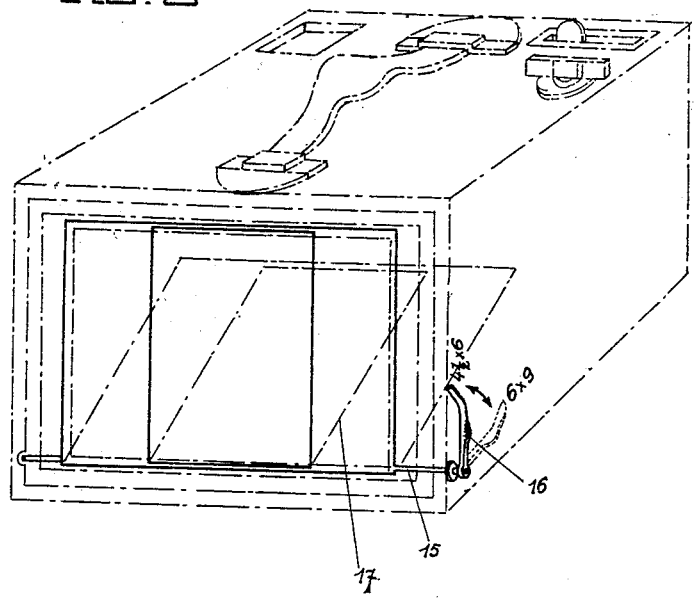

Figure 3 relates to another embodiment of the invention, which is specially available for magazine cameras.

In Figs. 1 and 2 the same elements are indicated by the same reference numbers.

In the embodiment represented by said Figs. 1 and 2, the aperture of the exposure frame 1 is reduced by means of two screens or masks in the form of curtains 3 and 3' of black silk or other suitable material, which are drawn toward each other by two metallic rods 2 and 2'. These curtains 3 and 3' are attached at one end to the rods 2 and 2' and at the other end to the walls of the exposure frame.

In order to effect this movement, the rods 2 and 2' are constantly drawn towards each other by retractile coil springs 4 and 4' which are attached to their ends; moreover, the size of the rods 2 and 2' and of the curtains 3 and 3' is such that the springs 4 and 4' are situated above and below the aperture of the exposure frame 1 and behind the two opposite sides of the frame 5.

Behind the two other opposite sides of the frame 5, and next to the curtain 3 are two small pulleys 6 and 6', and next to the curtain 3' a shaft 7 is rotatably mounted, one end of which extends outside the apparatus through a cushion 12.

Substantially in line with the extremities of the rods 2 and 2', the shaft 7 carries two laterally-projecting sectors 8 and 8'.

In order to control the rods and their curtains, two strings or cords 9 and 9' are fixed to the ends of the rod 2. These cords run respectively over the pulleys 6 and 6' and at their other end are respectively connected at 10 and 10' with the sectors 8 and 8'.

Similarly, two other cords 11 and 11' are attached to the ends of the rod 2' and also, respectively at 10 and 10' to the sectors 8 and 8'.

In order to make it possible for the sectors 8 and 8' to move in the proper direction, a crank 13 of suitable shape is mounted outside the apparatus, on the end of the shaft 7 which projects from the cushion 12. This crank moves in front of inscriptions made at suitable places on the casing of the apparatus. These inscriptions indicate for instance the sizes of negatives such as 6 x 9 or 9 x 12 centimetres.

In Figs. 1 and 2, the crank is placed before the inscription 6 x 9 centimetres and the curtains 3 and 3' being closed, the aperture of the exposure frame and, hence, the focal area, correspond to said size of 6 x 9 centimetres. When the crank is placed before the inscription 9 x 12 (centimetres), the sectors 8 and 8' are moved in a certain direction; the connection points 10 and 10' of the cords 9 and 9' and 11 and 11' are displaced in the direction of the arrows and the rods 2 and 2' disappear behind the frame 5 with the curtains 3 and 3'.

It is to be noted that in this embodiment the aperture of the exposure frame could even be reduced to an intermediate size, for instance to 9 x 9 centimetres. For that purpose it would be sufficient to place the crank 13 in the required position and the corresponding size would also be shown by an inscription on the outside of the apparatus.

The embodiment shown in Fig 3 comprises a shaft 15 provided with a crank 16 placed outside the apparatus, which crank can also be displaced in front of inscriptions indicating the corresponding focal areas of the camera.

In order to effect such variation, a screen or mask in the form of a shutter 17, which is connected to the shaft 15, is provided with an opening, which in the example shown by Fig. 3 corresponds to the size of 4½ x 6 centimetres. On turning the crank 16, the shutter 17 which lies inwardly against the exposure frame, is caused to turn down and consequently the proper focal area becomes available.

As is shown in Fig. 3 this last embodiment is specially useful with magazine cameras.

It is to be noted that in any case, the films to be used must bear two or more numberings, which as in systems known, move before small windows provided with a red glass. There must be as many different numberings as there can be taken different sizes. Besides, these small windows can be shut by means of a suitable mechanism when they do not correspond to the size of the negatives to be taken.

Having thus described my invention, what I claim and desire to secure by Letters Patent is:

1. In a camera, the combination, with the exposure frame, of a pair of coacting screens disposed at opposite sides of the exposure aperture of said frame and movable toward or from each other to vary the size of the aperture, springs connected at opposite ends to the mutually-adjacent front edges of said screens to pull the same toward each other, and means operable from the outside of the camera for moving said screens away from each other in unison against the action of said springs; substantially as described.

2. In a camera, the combination, with the exposure frame, of a pair of coacting screens disposed at opposite sides of the exposure aperture of said frame and movable toward or from each other to vary the size of the aperture, upper and lower retractile coil springs connected at opposite ends to the mutually-adjacent front edges of the screens above and below said aperture to pull said screens toward each other, and means for moving said screens away from each other in unison against the action of said springs; substantially as described.

3. In a camera, the combination, with the exposure frame, of a pair of coacting screens disposed at opposite sides of the exposure aperture of said frame and movable toward or from each other to vary the size of the aperture, spring means connecting the mutually-adjacent front edges of the screens to pull the same toward each other, an operating shaft, and flexible connections between said shaft and the said edges of the screens for drawing the latter away from each other in unison when said shaft is rotated; substantially as described.

4. In a camera, the combination, with the exposure frame, of a pair of coacting screens disposed at opposite sides of the exposure aperture of said frame and movable toward or from each other to vary the size of the aperture, spring means connecting the mutually-adjacent front edges of the screens to pull the same toward each other, an operating shaft, a pair of lateral members thereon, flexible elements connecting said members and the upper and lower ends of the front edge of one screen, a pair of guides adjacent the upper and lower ends of the front edge of the other screen, flexible elements connecting the said ends of the front edge of the second-named screen and said lateral members and passing around said guides, and means connected to rotate said shaft and thereby move the screens away from each other in unison; substantially as described.

5. In a camera, the combination, with the exposure frame having an aperture, of movable means associated with said frame for varying the focal area of the camera, a shaft journaled in said frame and operatively related to said movable means to shift the same with relation to said aperture, said shaft projecting exteriorly of the camera at one end, and a crank secured to said projecting end and movable selectively to different predetermined positions which correspond to different definite focal areas and which have inscriptions indicative of such areas; substantially as described.

In testimony whereof I affix my signature.

SILVIO COCANARI.

Witnesses:
GEORGES VANDER HAEGHEN,
LÉONARD LEVA.